United States Patent
Hillery

(10) Patent No.: US 12,552,269 B2
(45) Date of Patent: Feb. 17, 2026

(54) VEHICLE BATTERY POWER MONITORING AND MANAGEMENT SYSTEMS

(71) Applicant: Thomas H Hillery, Henderson, NV (US)

(72) Inventor: Thomas H Hillery, Henderson, NV (US)

(*) Notice: Subject to any disclaimer, the term of this patent is extended or adjusted under 35 U.S.C. 154(b) by 841 days.

(21) Appl. No.: 17/877,940

(22) Filed: Jul. 30, 2022

(65) Prior Publication Data

US 2022/0402375 A1 Dec. 22, 2022

Related U.S. Application Data

(63) Continuation-in-part of application No. 17/405,041, filed on Aug. 18, 2021, now Pat. No. 12,409,741, which is a continuation-in-part of application No. 17/353,720, filed on Jun. 21, 2021, now abandoned, which is a continuation-in-part of application No. 17/351,686, filed on Jun. 18, 2021, now Pat. No. 11,962,028.

(51) Int. Cl.
| | |
|---|---|
| B60L 50/64 | (2019.01) |
| B60L 58/10 | (2019.01) |
| H01M 10/42 | (2006.01) |
| H01M 10/48 | (2006.01) |
| H01M 50/204 | (2021.01) |
| H01M 50/543 | (2021.01) |

(52) U.S. Cl.
CPC ............... *B60L 50/64* (2019.02); *B60L 58/10* (2019.02); *H01M 10/425* (2013.01); *H01M 10/482* (2013.01); *H01M 50/204* (2021.01); *H01M 50/543* (2021.01); *H01M 2010/4271* (2013.01); *H01M 2220/20* (2013.01)

(58) Field of Classification Search
CPC .......................... H01M 50/543; H01M 4/244
See application file for complete search history.

(56) References Cited

U.S. PATENT DOCUMENTS 10,269,522 B2 * 4/2019 Kitano ................ H01M 50/567
2022/0368135 A1 * 11/2022 Nguyen ................. H02J 7/005

FOREIGN PATENT DOCUMENTS

KR 20130008136 A * 1/2013 .......... H01M 50/147

* cited by examiner

*Primary Examiner* — Maria Laios
*Assistant Examiner* — Jordan E Berresford
(74) *Attorney, Agent, or Firm* — Newman Law, LLC

(57) ABSTRACT

Vehicle battery power supply monitoring and management systems and methods for use with replaceable and rechargeable batteries, which among other things is configured to facilitate the sequential usage of each battery from a plurality of batteries secured within a vehicle based on a measurement of the condition of the battery, and facilitate the speed, ease and convenience in the removal and replacement of secured batteries.

4 Claims, 7 Drawing Sheets

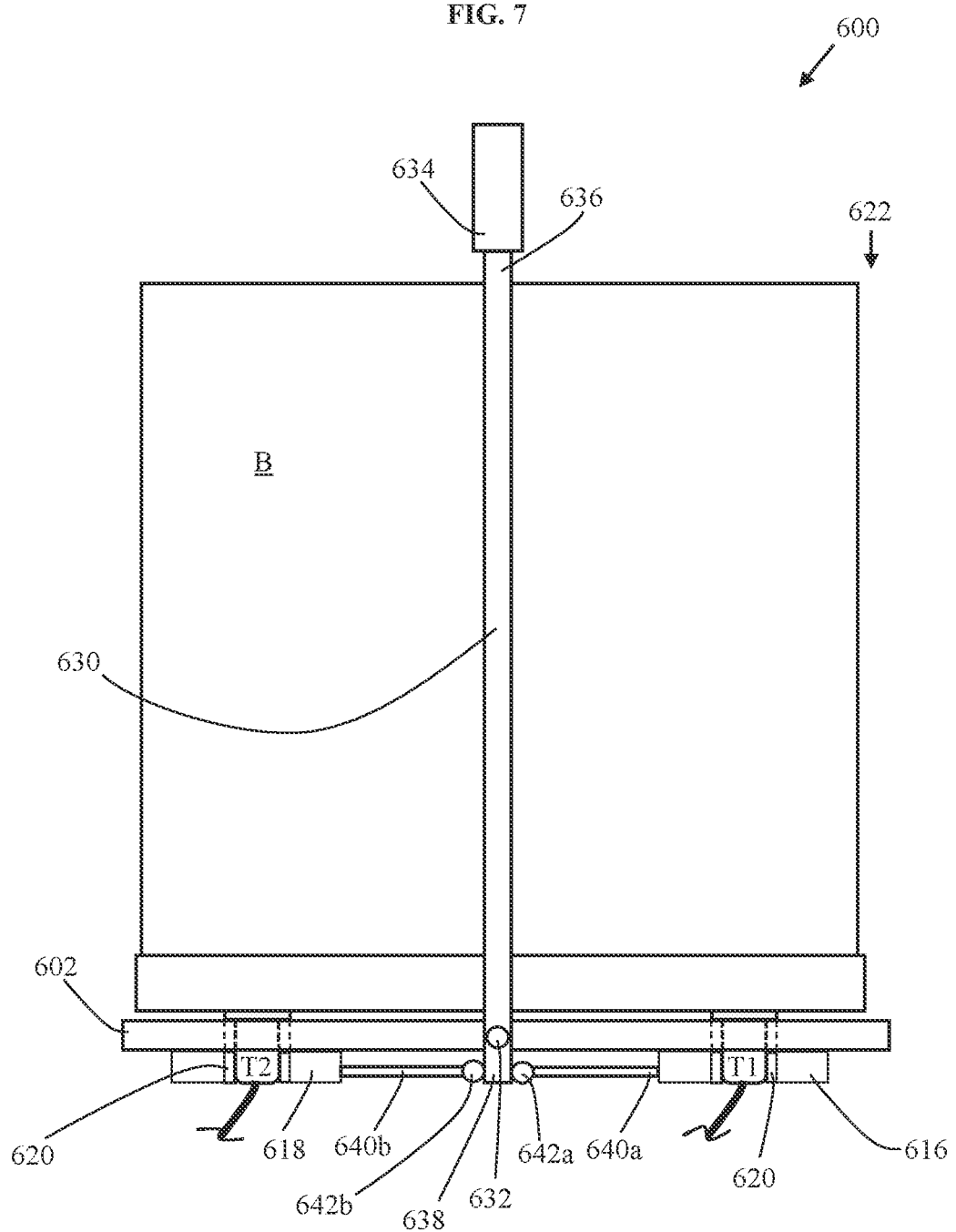

VEHICLE BATTERY POWER MONITORING AND MANAGEMENT SYSTEMS

BACKGROUND OF THE INVENTION

The invention relates generally to devices and methods for fastening and unfastening a battery, particularly batteries used for vehicles, whether mounted in an engine compartment or elsewhere on the vehicle or machine, which makes it less difficult and time-consuming to change the battery while also facilitating an electrical connection between the battery terminals and the cable connectors or other electrical conductors of the vehicle or machine. The invention also relates to battery systems for vehicles including multiple batteries and systems for the automated power management thereof.

Every machine using an internal combustion engine requires a battery primarily to provide direct current for the starter mechanism, usually a starter motor geared to the cranking mechanism. For hybrid vehicles, the batteries are a more integral part of the vehicle's functionality. Batteries also store current for the operation of the machine's other electrical and electronic devices.

Although fully electric vehicles may be powered by a high-voltage battery, many have automotive batteries as well to provide for accessories which run on a standard voltage, such as 12 volts. There are also concerns with the battery used to power fully electric vehicles. For example, an operator of an electric vehicle may be stranded if the battery runs out of charge or unable to continue traveling due to the time needed to recharge the depleted battery.

Whether placed in the engine compartment of the machine or elsewhere, batteries must be securely held down in order to prevent movement and unwanted contact with the battery terminals. Most automobiles typically have a battery hold down mechanism for securing their batteries. The standard battery hold down mechanism uses nuts or locknuts to secure the battery with hold down rods and clamps. Battery replacement therefore tends to require tools, such as ratchets, extensions and sockets.

A vehicle battery, such as a 12 volt automotive battery, is a heavy and unwieldy component and must often be mounted within a confined space in the vehicle. Thus, battery replacement requires the dexterity to access hard to reach areas in the engine compartment. Furthermore, weather-beaten hold downs are subject to rust and corrosion, making it very difficult for the average consumer to disengage the battery from the hold down rods and hold down clamps. Even for technicians, replacing batteries, particularly ones with rusted nuts and bolts, can be difficult and time-consuming.

For at least the foregoing reasons, unfastening, replacing and fastening a vehicle battery in its designated location is known to be a somewhat difficult, burdensome and time-consuming task.

Accordingly, there is a need for improvement and solution to address the aforementioned issues that make the battery replacement process less difficult, cumbersome and time-consuming, among other things.

SUMMARY OF THE INVENTION

The invention generally includes vehicle battery power supply monitoring and management systems and methods which, among other things, maintain a threshold voltage for a plurality of batteries in a battery group mounted within a vehicle.

In some embodiments, the invention is directed to a device for securing a battery group comprising a plurality of replaceable vehicle batteries, each battery of the battery group having a protruding positive terminal and a protruding negative terminal, the device comprising: a non-electrically conductive substrate for each battery of the battery group, the substrate defining a first side and a second side, the substrate including a first receiving port extending through the substrate from the first side to the second side and a second receiving port extending through the substrate from the first side to the second side, wherein the first receiving port and second receiving port are positioned and dimensioned to receive the protruding positive terminal and the protruding negative terminals therein, respectively, and the substrate has a thickness from the first side to the second side that is less than the length of the protruding positive and negative terminals; a set of electrical conductors mounted on the second side of the substrate for each battery of the battery group, the set of electrical conductors being configured to engage the protruding positive terminal and negative terminal whereby the set of electrical conductors electrically connect the battery with an internal vehicle wiring harness independently of the electrical connection of each other battery in the battery group; a relay in electrical communication with the set of electrical conductors for each battery of the battery group, the switch being enabled to switch to (i) a closed position, wherein the closed position establishes an electrical circuit between the battery and the internal vehicle wiring harness to supply current from the vehicle battery to the internal vehicle wiring harness, and (ii) an open position, wherein the open position interrupts electrical communication between the vehicle battery and the internal vehicle wiring harness; and a battery power control unit in electrical communication with a power source and the relay for each battery of the battery group, the battery power control unit comprising a processor and a memory, the memory including an executable program whereby the processor executes the program to monitor the condition of each battery of the battery group, wherein responsive to a monitored condition of a battery of the battery group being less than a threshold value, the battery management control unit (i) transmitting a signal to cause the relay for the batter to switch to the open position, and (ii) transmitting a signal to cause the relay for another battery in the battery group to switch to the closed position.

Some embodiments of the aforementioned invention include a first spring-biased clamp defined on the second side of the substrate, the first spring-based clamp including a first electrically conductive portion, wherein the first spring-biased clamp is configured to engage a protruding positive terminal of each vehicle battery, whereby the first electrically conductive portion is placed in electrical communication with the protruding positive terminal of each vehicle battery, and a second spring-biased clamp including a second electrically conductive portion, wherein the second spring-biased clamp is configured to engage a protruding negative terminal of each vehicle battery, whereby the second electrically conductive portion is placed in electrical communication with the protruding negative terminal.

In some embodiments, the first and/or second spring-biased clamp further comprises clamp opposing portions, each clamp opposing portion having an inner surface and an outer surface, the clamp opposing portions being mounted adjacent to the first and/or second receiving port, the clamp opposing portions being biased towards one another whereby the protruding positive and/or negative terminal forces the clamp opposing portions to move outwardly responsive to being received by the respective receiving port.

In some embodiments, the set of electrical conductors comprises the inner surfaces of the first and second clamp opposing portions.

In some embodiments, the invention is directed to a vehicle battery management system, comprising: a battery group mounted in a vehicle, the battery group comprising a plurality of vehicle batteries, wherein each battery includes electrical terminals; a plurality of electrical conductors operatively associated with the battery group, the plurality of electrical conductors including a first one or more electrical conductors associated with a first vehicle battery and a second one or more electrical conductors associated with a second vehicle battery of the plurality of vehicle batteries, the first one or more electrical conductors forming a non-permanent engagement with the electrical terminals of the first vehicle battery to electrically connect the first vehicle battery of the plurality of vehicle batteries in the battery group with an internal vehicle wiring harness independently of the second vehicle battery, the second one or more electrical conductors forming a non-permanent engagement with the electrical terminals of the second vehicle battery to electrically connect the second vehicle battery of the plurality of vehicle batteries in the battery group with the internal vehicle wiring harness independently of the first vehicle battery; a first electrically operated switch in electrical communication with the first one or more electrical conductors and a second electrically operates switch in electrical communication with the second one or more electrical conductors, each electrically operated switch being enabled to switch to (i) a closed position, wherein the closed position establishes an electrical circuit between a vehicle battery and the internal vehicle wiring harness to supply current from the vehicle battery to the internal vehicle wiring harness, and (ii) an open position, wherein the open position interrupts electrical communication between the vehicle battery and the internal vehicle wiring harness; a battery power control unit in electrical communication with a power source and each electrically operated switch, the battery power control unit comprising a processor and a memory, the memory including an executable program whereby the processor executes the program to monitor the condition of the first and second vehicle batteries of the plurality of vehicle batteries, wherein responsive to a monitored condition of the first vehicle battery being less than a threshold value, the battery management control unit (i) transmitting a signal to switch the first electrically operated switch to the open position, and (ii) transmitting a signal to switch the second electrically operated switch to the closed position; and a lever mounted for pivotal motion, wherein the pivotal motion of the lever causes the disengagement of at least one non-permanent engagement.

In some embodiments of the vehicle battery management system, the measured condition comprises a measurable value indicative of the remaining battery life of the vehicle battery.

In some embodiments of the vehicle battery management system, the measured condition comprises one or more of a battery state of charge, state of health, capacity or voltage of the vehicle battery.

In some embodiments of the vehicle battery management system, the battery management control unit transmits the signal to switch the second electrically operated switch to the closed position prior to transmitting the signal to switch the first electrically operated switch to the open position.

Some embodiments of the vehicle battery management system, further comprise a third one or more electrical conductors associated with a third vehicle battery of the plurality of vehicle batteries, the third one or more electrical conductors electrically connecting the third vehicle battery of the plurality of vehicle batteries in the battery group with the internal vehicle wiring harness independently of the first vehicle battery and the second vehicle battery; and a third electrically operated switch in electrical communication with the third one or more electrical conductors, wherein responsive to a measured condition of the second vehicle battery being less than a threshold value, the battery management control unit (i) transmitting a signal to switch the second electrically operated switch to the open position, and (ii) transmitting a signal to switch the third electrically operated switch to the closed position.

In some embodiments of the vehicle battery management system, the power source is one or more of the plurality of vehicle batteries in the battery group. The plurality of electrical conductors may include one or more electrical conductors electrically connecting the plurality of vehicle batteries together with the battery power control unit.

In some embodiments of the vehicle battery management system, the first and second electrically operated switches are in the open position and the battery power control unit transmits an initial signal to switch the first switch to the closed position.

Some embodiments of the vehicle battery management system further comprise a display device for displaying the measured voltage of at least one of the first and second vehicle batteries.

Some embodiments of the invention are directed to a vehicle battery management system, comprising: a battery group mounted in a vehicle, the battery group comprising a plurality of vehicle batteries; a plurality of electrical conductors operatively associated with the battery group, the plurality of electrical conductors including one or more electrical conductors associated with each vehicle battery of the plurality of vehicle batteries, the one or more electrical conductors electrically connecting each vehicle battery of the plurality of vehicle batteries in the battery group with an internal vehicle wiring harness independently of any of the other vehicle batteries in the battery group, wherein the plurality of electrical conductors are operatively associated with the battery group by a substrate defining a first side and a second side, the substrate including a first receiving port extending through the substrate from the first side to the second side and a second receiving port extending through the substrate from the first side to the second side, a first spring-biased clamp including a first electrically conductive portion, wherein the first spring-biased clamp is configured to engage a protruding positive terminal of each vehicle battery, whereby the first electrically conductive portion is placed in electrical communication with the protruding positive terminal of each vehicle battery, and a second spring-biased clamp including a second electrically conductive portion, wherein the second spring-biased clamp is configured to engage a protruding negative terminal of each vehicle battery, whereby the second electrically conductive portion is placed in electrical communication with the protruding negative terminal; a plurality of electrically operated switches, each electrically operated switch being in electrical communication with the one or more electrical conductors associated with each vehicle battery, each electrically operated switch being enabled to switch to (i) a closed position, wherein the closed position establishes an electrical circuit between a vehicle battery and the internal vehicle wiring harness to supply current from the vehicle battery to the internal vehicle wiring harness, and (ii) an open position, wherein the open position interrupts electrical communication between the vehicle battery and the internal vehicle wiring harness; a battery power control unit in electrical communication with a power source and each electrically operated switch of the plurality of electrically operated switches, the battery power control unit comprising a processor and a memory, the memory including an executable program whereby the processor executes the program to (i) monitor battery measurements of each vehicle battery of the plurality of vehicle batteries in the battery group, wherein responsive to the vehicle battery having a lesser measured battery life than a threshold value, the battery management control unit identifying a vehicle battery having a greater measured battery life than the threshold value, (ii) switch the electrically operated switch associated with the vehicle battery having the greater measured battery life than the threshold value to the closed position and (iii) switch the electrically operated switch associated with the vehicle battery having the lesser measured battery life than the threshold value to the open position; and a lever mounted for pivotal motion to the substrate, the lever defining a first end and a second end, the second end being connected with the first and second spring-biased clamps by first and second push rods, wherein the pivotal motion of the lever overcomes the spring-bias of the first and second clamps to cause the disengagement of the first and second electrically conductive portions with the protruding positive and negative terminal clamps.

In some embodiments of the vehicle battery management system, the measured battery life comprises at least one of a battery state of charge, state of health, capacity or voltage. In some embodiments, the battery power control unit further includes a measuring device connected to each of the batteries, such as a multimeter or voltmeter.

As mentioned above, the power source may be one or more of the plurality of vehicle batteries in the battery group and the plurality of electrical conductors may include one or more electrical conductors electrically connecting the plurality of vehicle batteries together with the battery power control unit.

In some embodiments of the vehicle battery management system, a display device is mounted within a vehicle passenger compartment and configured to display the measured voltage of each of the plurality of vehicle batteries in the battery group. For example, the display device may be analogous or comparable to a fuel gauge in a gasoline powered vehicle.

In some embodiments of the vehicle battery management system, an audio device is mounted within a vehicle passenger compartment for emitting an audible sound responsive to the vehicle battery having the lesser measured voltage.

In some embodiments of the vehicle battery management system, the battery power control unit transmits an electrical signal to the electrically operated switches to switch the electrically operated switches to the open condition and to the closed condition.

In some embodiments of the vehicle battery management system, each electrically operated switch is in the open position and the battery power control unit transmits an electrical signal to the electrically operated switches to switch the electrically operated switches to the closed condition.

In some embodiments of the vehicle battery management system, the one or more electrical conductors comprise a substrate defining a first side and a second side, the substrate including a first receiving port extending through the substrate from the first side to the second side and a second receiving port extending through the substrate from the first side to the second side, a first spring-biased clamp including a first electrically conductive portion, wherein the first spring-biased clamp is configured to engage a protruding positive terminal of each vehicle battery, whereby the first electrically conductive portion is placed in electrical communication with the protruding positive terminal of each vehicle battery; and a second spring-biased clamp including a second electrically conductive portion, wherein the second spring-biased clamp is configured to engage a protruding negative terminal of each vehicle battery, whereby the second electrically conductive portion is placed in electrical communication with the protruding negative terminal.

In some embodiments of the vehicle battery management system, the first spring-biased clamp comprises first clamp opposing portions, each first clamp opposing portion having an inner surface and an outer surface, the first clamp opposing portions being mounted adjacent to the first receiving port, the first clamp opposing portions being biased towards one another whereby one of either the protruding positive terminal forces the first clamp opposing portions to move outwardly responsive to being received by the first receiving port or the first clamp opposing portions are manually moved outwardly to receive the protruding positive terminal.

In some embodiments of the vehicle battery management system, the second spring-biased clamp comprises second clamp opposing portions, each second clamp opposing portion having an inner surface and an outer surface, the second clamp opposing portions being mounted adjacent to the second receiving port, the second clamp opposing portions being biased towards one another whereby one of either the protruding negative terminal forces the second clamp opposing portions to move outwardly responsive to being received by the second receiving port or the second clamp opposing portions are manually moved outwardly to receive the protruding negative terminal.

In some embodiments of the vehicle battery management system, the first electrically conductive portion comprises the inner surfaces of the first clamp opposing portions.

In some embodiments of the vehicle battery management system, the second electrically conductive portion comprises the inner surfaces of the second clamp opposing portions.

The invention is also generally directed to improvements in vehicle battery securing devices, which may be used to secure the aforementioned batteries and battery group as well as other replaceable vehicle batteries.

Some embodiments of the invention are directed to a device for securing a replaceable vehicle battery having a protruding positive terminal and a protruding negative terminal, the device comprising: a substrate defining a first side and a second side, the substrate including a first receiving port extending through the substrate from the first side to the second side and a second receiving port extending through the substrate from the first side to the second side, wherein the first receiving port and second receiving port are positioned and dimensioned to receive the protruding positive terminal and the protruding negative terminals therein, respectively, and the substrate has a thickness from the first side to the second side that is less than the length of the protruding positive and negative terminals; a first spring-biased clamp mounted on the second side of the substrate, the first clamp including a first electrically conductive portion, wherein the first clamp is configured to engage the protruding positive terminal whereby the electrically first conductive portion is placed in electrical communication with the protruding positive terminal; and a second spring-biased clamp mounted on the second side of the substrate, the second clamp including a second electrically conductive portion, wherein the second clamp is configured to engage the protruding negative terminal whereby the second electrically conductive portion is placed in electrical communication with the protruding negative terminal.

In some embodiments, the substrate is positioned in a battery space defined by one or more walls.

In some embodiments, the one or more walls include a hinge, wherein the hinge is connected to the substrate to enable the substrate for pivotal motion.

In some embodiments, the first spring-biased clamp comprises first clamp opposing portions, each first clamp opposing portion having an inner surface and an outer surface, the first clamp opposing portions being mounted adjacent to the first receiving port, the first clamp opposing portions being biased towards one another whereby the protruding positive terminal forces the first clamp opposing portions to move outwardly responsive to being received by the first receiving port.

In some embodiments, the second spring-biased clamp comprises second clamp opposing portions, each second clamp opposing portion having an inner surface and an outer surface, the second clamp opposing portions being mounted adjacent to the second receiving port, the second clamp opposing portions being biased towards one another whereby the protruding negative terminal forces the second clamp opposing portions to move outwardly responsive to being received by the second receiving port.

In some embodiments, the first electrically conductive portion comprises the inner surfaces of the first clamp opposing portions.

In some embodiments, the second electrically conductive portion comprises the inner surfaces of the second clamp opposing portions.

Other embodiments, features and advantages of the invention will be readily appreciated and apparent from the following detailed description when considered in connection with the accompanying drawings.

BRIEF DESCRIPTION OF THE DRAWINGS

Various advantages of the invention will be readily appreciated as the same becomes better understood by reference to the following detailed description when considered in connection with the accompanying drawings. The components in the figures are not necessarily to scale, emphasis instead being placed upon illustrating the principles of the invention.

FIG. 7 is a schematic view of yet another embodiment of the invention, illustrating, among other things, an assembly for facilitating the removal of a battery from a battery compartment in accordance with the invention.

DETAILED DESCRIPTION OF THE INVENTION

The following detailed description provides exemplary embodiments of devices for securing batteries, and in particular, vehicle batteries. It will be readily understood from the description of the embodiments of the invention herein, and the elements thereof, could be alternatively configured within the scope of the invention. This description is therefore intended to generally describe and illustrate examples of the invention, but is not intended to limit the scope of the invention to the examples, embodiments and elements described herein.

Figure 1:
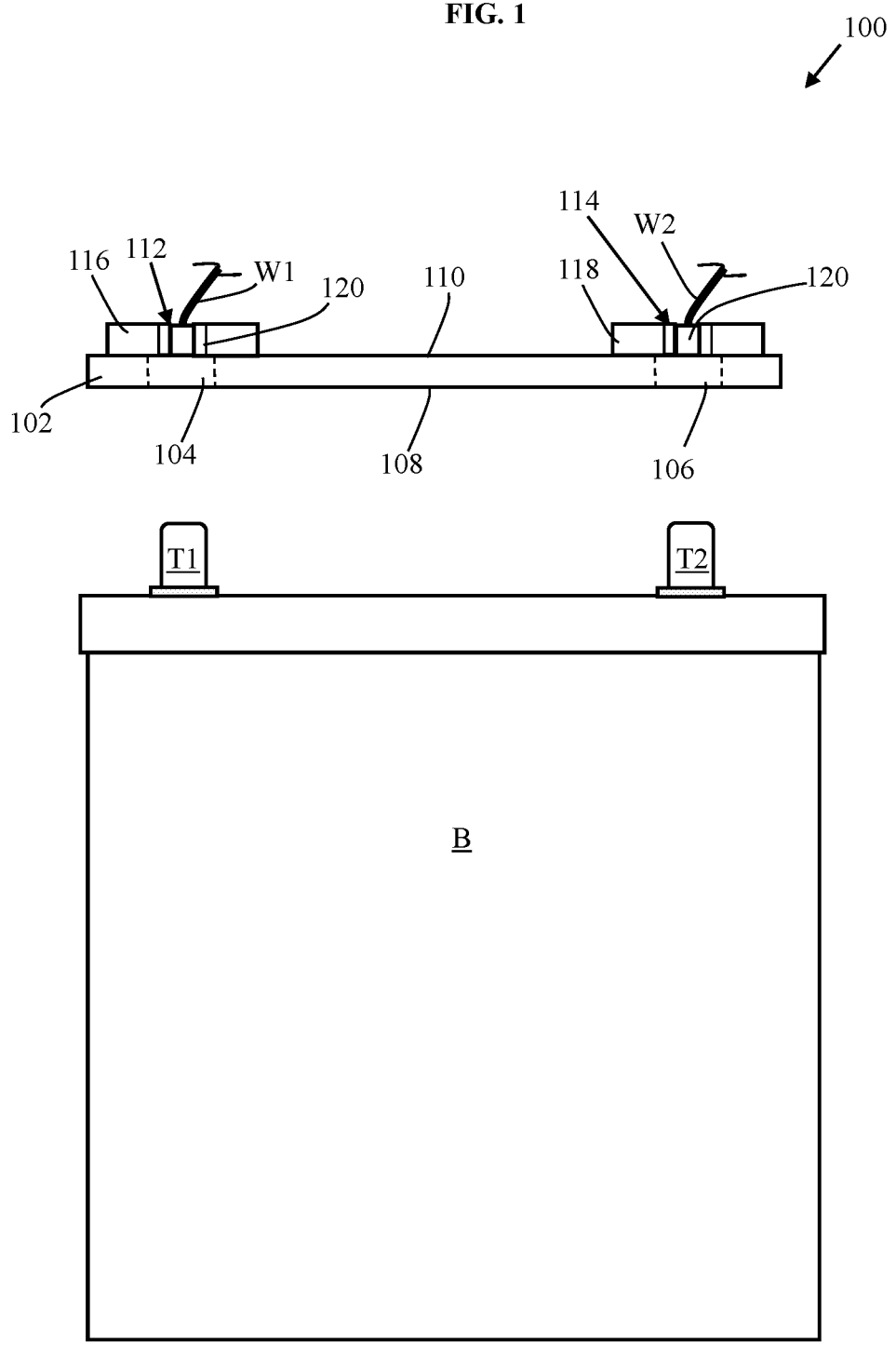
FIG. 1 is a schematic view of a system constructed in accordance with an embodiment of the invention.

FIG. 1 illustrates a battery mounting and securing device 100 for securing a battery B, including a connecting plate 102 having receiving ports 104 and 106 configured and dimensioned to receive battery terminals T1 and T2, respectively. It should be understood that the size and shape of battery B depicted in the figures is for purposes of illustrating features of the invention and the embodiments depicted. This depiction of battery B is non-limiting, in that the invention, including the embodiments of the invention discussed herein, may incorporate any number of batteries and batteries of any size or shape. One or more of the batteries B may also be in one or more orientations within the vehicle. In some embodiments, one or both terminals T1 and T2 are of a shape, such as conical, or cylindrical. One or both terminals may be of an expanding shape which is operated manually with a rotation or lever, or with the assistance of a stepper motor. It should be understood that the term battery is meant to encompass any type, design or size of battery, including any single use or rechargeable batteries, electrochemical batteries, lead-acid batteries, nickel-metal hydride batteries, fuel cells and lithium ion batteries, for example. While "positive" and "negative" are used herein in reference to terminals T1 and T2, it should be understood that such terms refer to the provision of an electrical connection with battery B, and are non-limiting, in that other battery B may have other shapes and forms or devices, at different locations on battery B, which are configured to establish an electrical connection, such as male and female connectors, one connection point or terminal, greater than two connection points or terminals, etc. In addition, the parts for facilitating an electrical connection with battery B, such as terminals T1 and T2, may include additional configurations or features, such as for example, to facilitate a connection, for space considerations or for safety reasons.

In this embodiment, ports 104 and 106 extend from a first side 108 of plate 102 to a second side 110 opposing first side 108. Second side 110 includes electrical connectors 112 and 114 for forming an electrical connection with terminals T1 and T2 responsive to terminals T1 and T2 being inserted and received by ports 104 and 106, respectively.

Connectors 112 and 114 may be further connected with wires W1 and W2 for enabling a flow of electricity from battery B to other components, such as a vehicle starter motor or accessory devices. In some embodiments, electrical connectors 112 and 114 include a device or mechanism for securely forming a non-permanent engagement with terminals T1 and T2 to facilitate the integrity of the electrical communication with connectors 112 and 114. In this embodiment, biased clamping mechanisms or clamps 116 and 118 are mounted on second side 110 of plate 102 in a position adjacent to ports 104 and 106, respectively.

Figure 2:
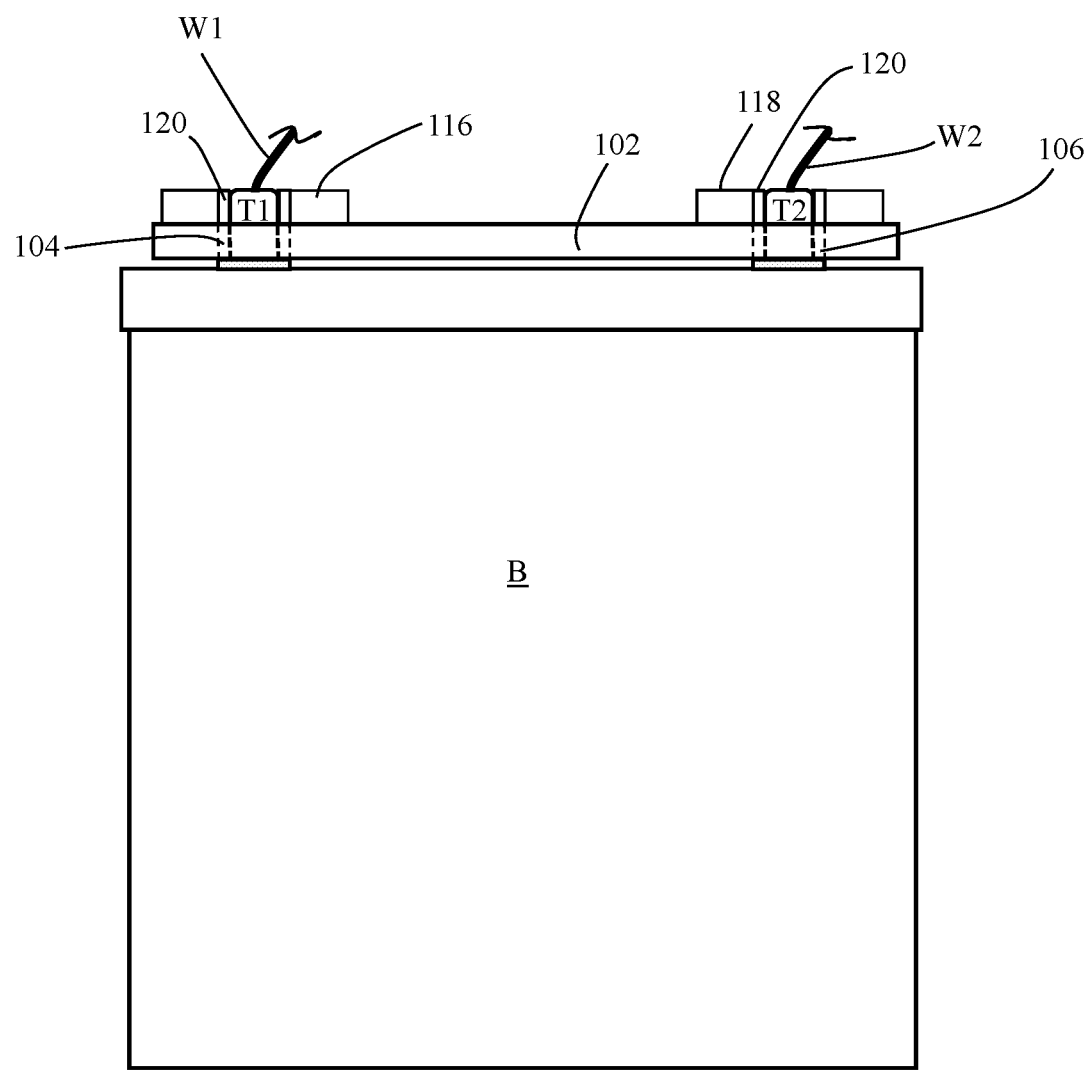
FIG. 2 is depicts the embodiment of the invention shown in FIG. 1, illustrating the connection of the substrate with the battery terminals.
Figure 3:
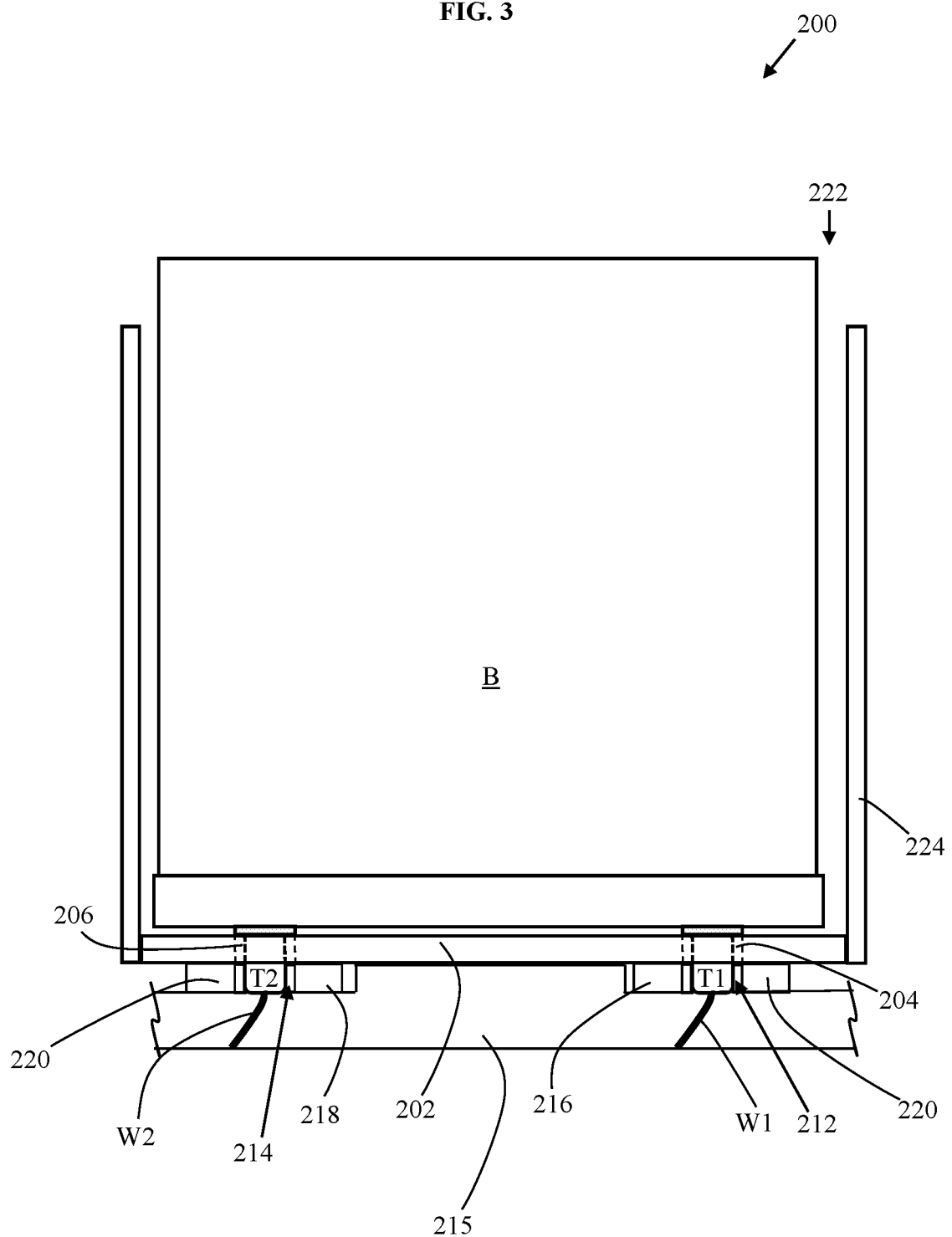
FIG. 3 is a schematic view of another embodiment of the invention.
Figure 4:
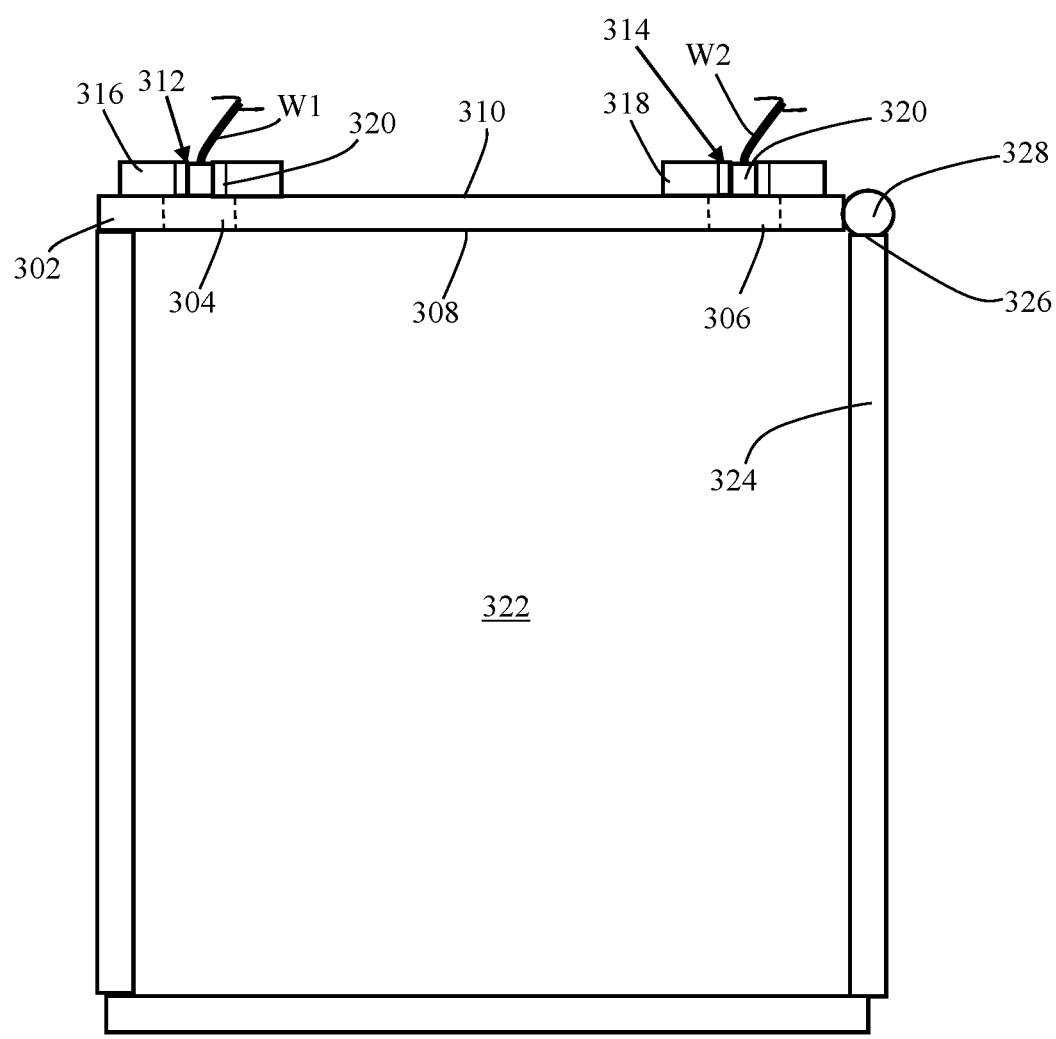
FIG. 4 is a schematic view of yet another embodiment of the invention.

Clamps 116 and 118 may be spring-biased clamps which comprise electrical connectors 112 and 114 such that clamps 116 and 118 securely engage with terminals T1 and T2 physically, while also enabling electrical communication between terminals T1 and T2 and connectors 112 and 114. Each clamping portion 120 of clamps 116 and 118 may be configured to open or expand outwardly responsive to terminals T1 and T2 being received in ports 104 and 106, as shown in FIG. 2, while remaining biased to facilitate the electrical communication with connectors 112 and 114. Each clamping portion 120 of clamps 116 and 118 may also include gripping portions or otherwise be manually operable, such as being openable against the biasing action, for being securely engaged with terminals T1 and T2. It should be understood that clamps 116 and 118, and plate 102 can be formed of a non-electrically conductive material along with any other components that are not intended to enable electrical communication between terminals T1 and T2 and connectors 112 and 114, respectively.

It should be understood that plate 102 may be operatively associated with other battery hold down mechanisms or features to facilitate seating battery B in a vehicle. For example, a system 200 includes a plate 202 that comprises a bottom or bottom portion of a battery holding space 222 within a vehicle. Space 222 in this embodiment is further defined by one or more walls 224 to facilitate securing batter B in space 222. The positioning of plate 202 as the bottom of space 222 enables battery B to be inserted downward into space 222 with terminals T1 and T2 subsequently being received in ports 204 and 206 and forming an electrical connection between terminals T1 and T2 and connectors 212 and 214, respectively, as a result of clamps 216 and 218 facilitating an engagement between clamping portions 220 and terminals T1 and T2. It should be understood that clamps 216 and 218, and plate 202 can be formed of a non-electrically conductive material along with any other components that are not intended to enable electrical communication between terminals T1 and T2 and connectors 212 and 214, respectively. In this embodiment, wires W1 and W2 extend through a housing 215 which is formed of a non-electrically conductive material. Housing 215 contacts plate 202 and further supports a battery B mounted in battery holding space 222 and electrical communication between terminals T1 and T2 and connectors 212 and 214. Clamps 216 and 218 and connectors 212 and 214 may be formed as a part of, or otherwise be operatively associated with, housing 215. Housing 215 may be a separate element or part of the vehicle battery structure. In some embodiments, housing 215 and plate 202 are formed as a single or associated parts of a vehicle.

In other embodiments, a battery holding space 322 may include one or more walls 324 having an edge 326 with a hinged or other connection 328 with plate 302 to enable pivotal motion of plate 302. In this embodiment, hinged connection 328 enables plate 302 to be pivoted between a first position allowing access to space 322, whereby battery B can be placed therein, a second position, whereby plate 302 is pivoted over space 322 and terminals T1 and T2 can be received by ports 304 and 306 and subsequently secured by clamps 316 and 318 to be placed into electrical communication with connectors 312 and 314. It should be understood that walls 324 are for illustrative purposes only, and may comprise any structural component having suitable stability, such as a bar, beam, frame or framework for example, and may also comprise or include existing parts of holding space 322 for purposes of retrofitting a system 300, or other system constructed in accordance with the invention, within a vehicle.

Figure 5:
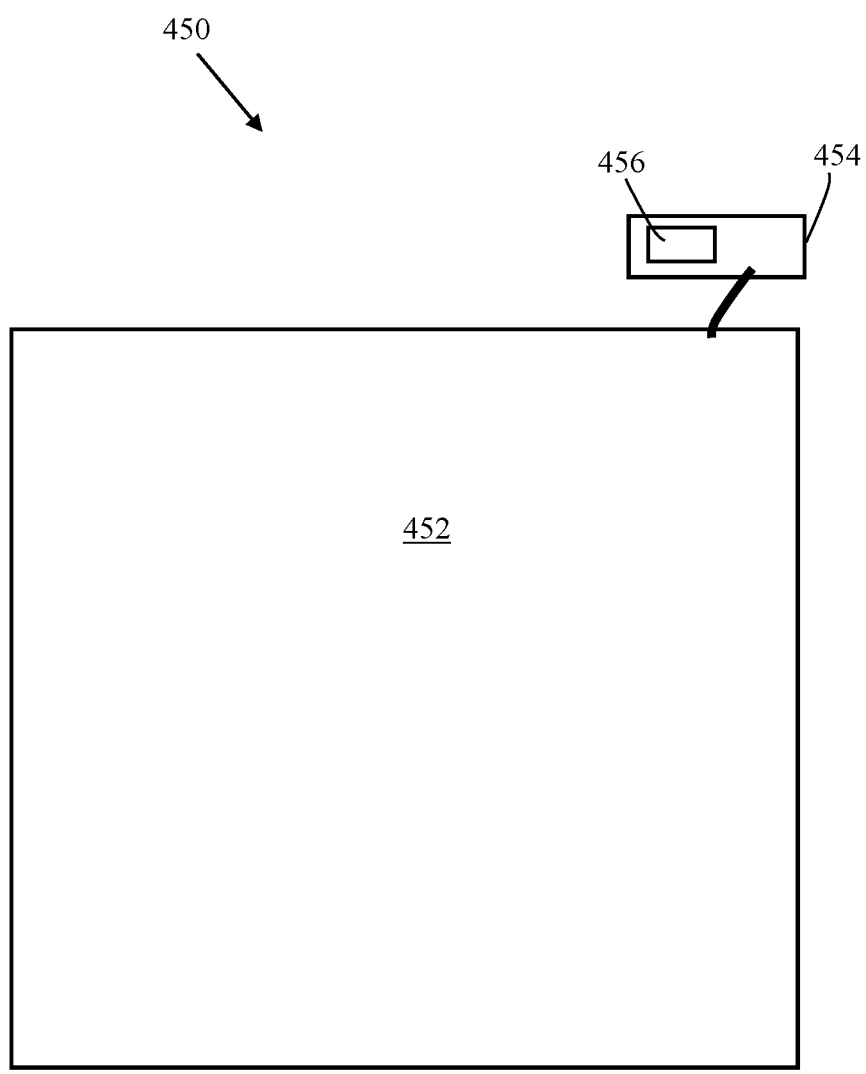
FIG. 5 is a schematic view of a battery group and battery management system which is particularly well-suited for use with an electric vehicle and constructed in accordance with the invention.

As shown in FIG. 5, the invention is directed to a vehicle battery system 450 including a battery group 452 comprising two or more batteries connected with one another and a cooperating mounting system inside a vehicle to supply power to a vehicle sequentially, that is, with each battery being used and depleted one at a time such that when a first battery is fully exhausted the second battery remains fully charged and so on until the power of the last battery in the group 452 is depleted.

System 450 further includes a battery power control unit 454 having meters or sensors for detecting, measuring or monitoring values and/or determining conditions relating to each battery of the battery group 452, such as the individual battery and/or battery group and voltage, voltage drop, state of health, state of charge, impedance, degradation, electrical capacity and electrical charge, and the rate of change of any of the foregoing, among other things, and an automated process for facilitating the sequential use of each battery in group 452 responsive to battery conditions as described herein. Control unit 454 may include and/or be in communication with various hardware components for detecting battery conditions, such as integrated circuits, small sense resistors, hall-effect sensors, thermocouples, resistance temperature detectors, thermistors, among other things, that may be used to measure conditions such as voltage, current and temperature. It should be understood that communication to and/or between control unit 454 and other components for any or all information may be through wired and/or wireless technology, and may further or in addition, communicate with portable devices such as a smartphone. For example, a wireless, short range technology for monitoring the battery system can be employed, such as Bluetooth or other wireless communication protocols, which enable both internal battery monitoring, such as by control unit 454, and external, such as by a user device or charging station device. In addition, the batteries of the invention may include detectable tags, such as RFID or near field technology tags, which are detectable by the control unit 454 or other components in order to confirm the authenticity and other details of the battery, such as history and battery number.

In this embodiment battery power control unit 454 includes a specialized computer 456 which may include circuitry connected to group 452 for monitoring battery condition, such as the useful life remaining in each battery in group 452, and/or detecting or determining power usage and estimated remaining time or charge left in each battery in group 452, comparing a measured battery condition with a threshold value, and thereafter switching between batteries within group 452 to use and receive electrical power from a battery having at least a threshold amount of life remaining.

Computer 456 may include hardware such as a processor and memory containing software programming executable by the processor, as well as a data communication device for communicating with a gauge or display device within the passenger compartment of the vehicle, such as a display device comprising the vehicle dashboard. The gauge or display may indicate information relating to group 452 and each battery in group 452, such as the remaining life of group 452 and each battery in group 452, estimated time to battery depletion of group 452 and in each battery within group 452, which may be relative to one or more threshold values, and expressed as estimated mileage, distance or time available for continued operation. It should be understood that computer 456 may calculate and adjust such indications provided by the display during usage of the vehicle and based on various factors, such as for example, the type or manner of operation of the vehicle, driving conditions, and external temperature or internal temperature readings from a sensor included with control unit 454.

Computer 456 may use algorithms based on the vehicle and detected battery conditions to determine any value indicative of the remaining battery life, battery health, battery degradation and/or capacity for comparison with threshold values. For example, the length of time a battery will be expected to operate at a given current may be determined by monitoring charge or load current over time using coulomb counting techniques. Voltage may be measured and adjusted using voltage estimation techniques and adjusted based on temperature readings. Other measurements may include or relate to charge cycle, impedance, current change, resistance, capacitance, polarization and differential.

Control unit 454 may use various known methods for measuring battery conditions. For example, control unity 454 may include a battery life tester having a high-power load circuit mounted therein for a large discharging current so that the battery life tester can measure a voltage drop and thus a discharging capability of batteries, a state of degradation of the battery can be determined from the discharging capability. Control unit 454 may include a charger and a charging counter which starts counting time for comparing with the starting capacity of the battery to determine the state of health of the battery. Control unit 454 may use the current method and internal resistance method to measure battery capacity. It should be understood that other conventional and known methods for measuring battery conditions for vehicle batteries may be incorporated along with any specialized hardware and software for facilitating such methods in accordance with the invention.

Figure 6:
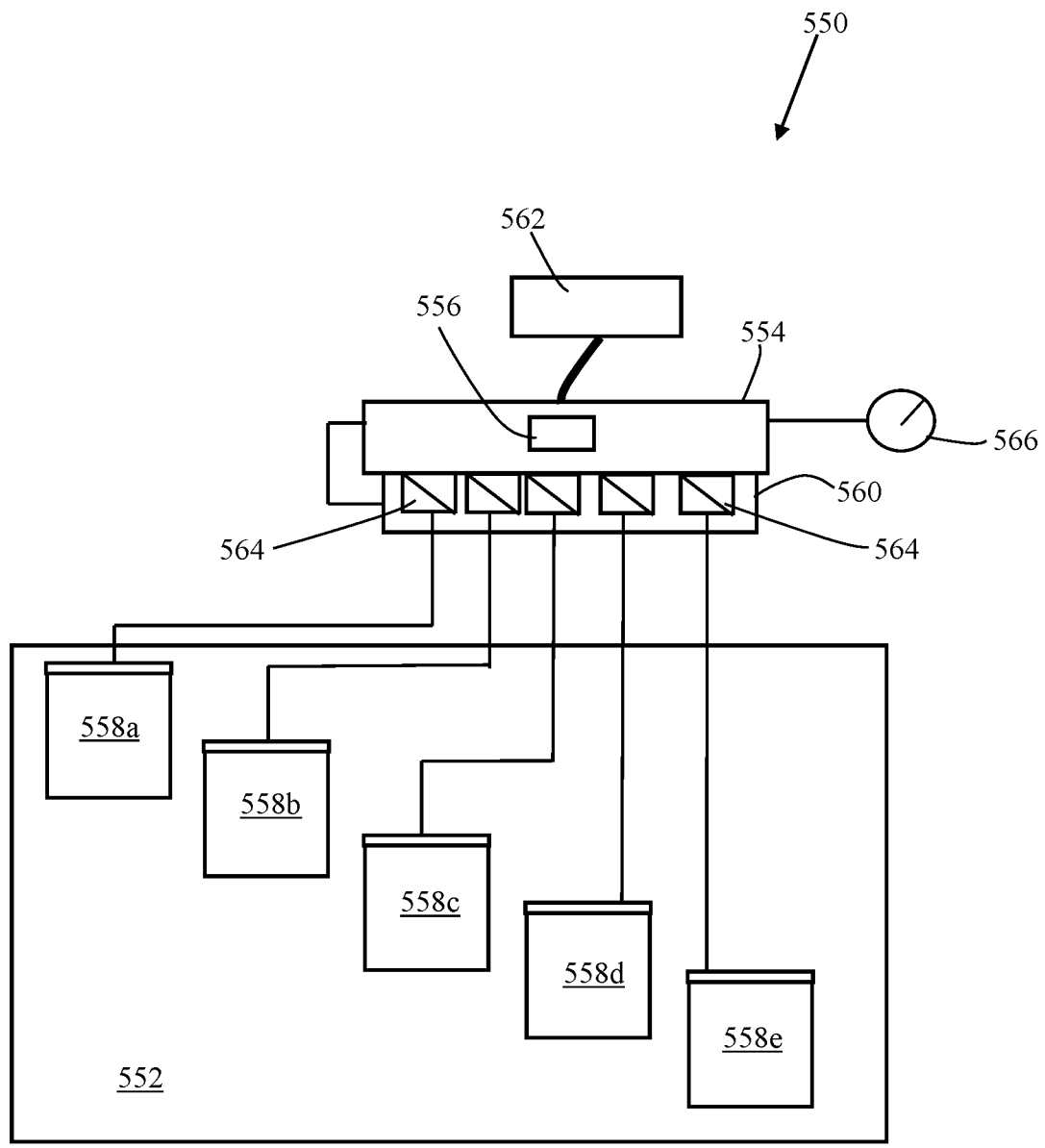
FIG. 6 is a schematic view of an embodiment of the system shown in FIG. 5.

As shown in FIG. 6, a system 550 includes battery group 552 includes five batteries 558*a*, 558*b*, 558*c*, 558*d* and 558*e* engaged with a wiring harness 560 which connects with the internal vehicle wiring connection 562. It should be understood that five batteries are shown as an example and not to be construed as limiting of the number of batteries that may be used in connection with the embodiments of the invention, including as part of a battery group such as battery group 552.

Power from battery group 552 connections with wiring harness 560 powers battery control unit 554 and computer 556 therein, either individually or as a group. Connections between harness 560 and each battery 558*a-e* enable control unit 554 to monitor battery conditions in each of the batteries 558*a-e*, and these or other connections further incorporate circuitry to establish electrical communication with each battery 558*a-e* and the supply of electrical current to vehicle wiring connection 562.

Responsive to control unit 554 detecting depletion of voltage in one of the batteries 558*a-e*, which may be a detection of one or more of a voltage, state of charge or state of health which is less than one or more of a threshold voltage, state of charge or state of health, control unit 554 actuates a battery switching routine to enable electrical communication with another of the batteries 558*a-e*.

In this embodiment, the battery switching routine involves the circuit created by the wired connections between harness 560 and batteries 558*a-e* with one or more switches or relays 564 in electrical communication with each battery 558*a-e* and control unit 554. Relays 564 are alternately switched on and off, that is, opened and closed, by receiving an electrical signal from control unit 554. Control unit 554 thus maintains all relays 564 in an open position so that no circuit is formed between four of the five batteries 558*a-e*, while a single relay 564 is closed to form a circuit with one of batteries 558*a-e* until the measured condition of that battery is less than a threshold value, such as the measured or determined voltage, state of health or state of charge being less than a threshold voltage, state of health value or state of charge value. Responsive to the battery of batteries 558*a-e* from which electrical current is being received having a voltage less than the threshold voltage, control unit 554 transmits an electrical signal to close an open relay 564 associated with another of battery 558*a-e*, thus completing a circuit for electrical communication from battery to vehicle wiring connection 562. In some embodiments, solid state high voltage relays are employed as relays 564 which are configured to close when a low voltage control signal from control unit 554 is generated and/or received, and applied, thus such relay closure will remain at the high voltage needed to operate the next battery in order to run the vehicle motor.

In order to maintain a constant electrical connection, control unit 554 may close the open relay 564 for the other battery 558*a-e* while either simultaneously or within a preset period of time thereafter opening the first closed relay 564. Once the other battery 558*a-e* is reduced below a threshold voltage, the process repeats itself until all batteries 558*a-e* are depleted in series, though it is presumed that the depleted batteries 558*a-e* will be replaced by a fully charged battery, such as by the vehicle owner/operator or service station attendant, or possibly recharged before the final battery 558*a-e* falls below the threshold voltage value. Each time a battery 558*a-e* falls below the threshold voltage, control unit 554 causes the display device or gauge 566 to visually indicate the event so that the vehicle operator is made aware of the condition of batteries 558*a-e*.

Systems and methods of the invention, including systems 450 and 550, are particularly well-suited for use in fully electric vehicles. Dividing a single or even multiple batteries into more manageable, easily and readily replaceable smaller batteries, various issues, such as the issues associated with battery power management, recharge time and hassle, are largely if not fully resolved. The use of such systems and methods of the invention will substantially reduce the need for electric vehicle charging stations and the exorbitant costs (in money and time) of erecting such an infrastructure to support long-distance travel using fully electric vehicles. In addition, to facilitate battery removal and replacement in the battery group, the battery mounting and securing device of the invention such as device 100 discussed above may be used to securely connect each battery 558*a-e* with the wired connections with harness 560 and/or control unit 554.

FIG. 7 illustrates another exemplary embodiment of the invention in system 600 which includes plate 602 that comprises a bottom or bottom portion of a battery holding space 622 within a vehicle. The positioning of plate 602 in space 622 enables battery B to be inserted downward into space 622 with terminals T1 and T2 subsequently being received in ports 604 and 606 and forming an electrical connection between terminals T1 and T2 and connectors 612 and 614, respectively, as a result of clamps 616 and 618 facilitating an engagement between clamping portions 620 and terminals T1 and T2. In this embodiment, a lever 630 is mounted for pivotal motion on plate 602 at a fulcrum 632. Lever 630 includes a handle 634 at a first end 636 which is configured to extend from battery holding space 622. At the second opposing end 638, lever 630 is operatively associated with an assembly for causing clamps 616 and 618 to move from a closed position to an open position, thus resulting in the disengagement of terminals T1 and T2 and clamping portions 620 of clamps 616 and 618, respectively, which in turn, facilitates the removal of battery B from battery holding space 622. In some embodiments, clamps 616 and 618 are spring-loaded or otherwise biased towards the closed position In this embodiment, connecting push rods 640a and 640b are connected at second end 638 of lever 630 to apply force sufficient to open both clamps 616 and 618 with the same pivoting motion of lever 630.

In some embodiments, push rods 640a and 640b are driven by swivel connector assemblies 642a and 642b attaching each push rod 640a and 640b with second end 638 of lever 630, whereby the pivoting motion of lever 630 in one direction enables both push rods 640a and 640b to apply a simultaneous lateral force to each of the opposing ends of clamps 616 and 618, respectively, sufficient to cause clamping portions 620 of each clamp 616 and 618 to disengage with the battery terminals at the same time. It should be readily apparent that it is within the scope of the invention to employ other mechanisms and assemblies known in the art to enable a single pivoting motion of lever 630 to cause the disengagement of clamps 616 and 618 with terminals T1 and T2.

In some embodiments, lever 630 may be ratcheted or otherwise lock in place so that clamps 616 and 618 remain in the open position until lever 630 is released which releases the force transferred by lever 630 and connecting push rods 640a and 640b to open clamps 616 and 618, respectively.

Although specific features of various embodiments of the invention may be shown in some drawings and not in others, this is for convenience only. In accordance with the principles of the invention, any feature of a drawing may be referenced and/or claimed in combination with any feature of any other drawing.

In some embodiments, the methods, systems, and media disclosed herein include software, server, and/or memory or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. A computer, control unit or controller as used herein may include a processor, which may further include any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of such terms.

While exemplary devices, apparatus, systems and methods of the invention have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth by the claims and any equivalents thereto.

The invention claimed is:

1. A device for securing a battery group comprising a plurality of replaceable vehicle batteries, each battery of the battery group having a protruding positive terminal and a protruding negative terminal, the device comprising:

a) a non-electrically conductive substrate for each battery of the battery group, the substrate defining a first side and a second side, the substrate being positioned in a battery space defined by one or more walls and including a first receiving port extending through the substrate from the first side to the second side and a second receiving port extending through the substrate from the first side to the second side, wherein the first receiving port and second receiving port are positioned and dimensioned to receive the protruding positive terminal and the protruding negative terminals therein, respectively, and the substrate has a thickness from the first side to the second side that is less than the length of the protruding positive and negative terminals, wherein t least one wall of the one or more walls in the battery space includes a hinge, wherein the hinge is connected to the substrate to enable the the substrate for pivotal motion about the hinge;

b) a set of electrical conductors mounted on the second side of the substrate for each battery of the battery group, the set of electrical conductors being configured to engage the protruding positive terminal and negative terminal whereby the set of electrical conductors electrically connect the battery with an internal vehicle wiring harness independently of the electrical connection of each other battery in the battery group;

c) a relay in electrical communication with the set of electrical conductors for each battery of the battery group, the switch being enabled to switch to (i) a closed position, wherein the closed position establishes an electrical circuit between the battery and the internal vehicle wiring harness to supply current from the vehicle battery to the internal vehicle wiring harness, and (ii) an open position, wherein the open position interrupts electrical communication between the vehicle battery and the internal vehicle wiring harness; and d) a battery power control unit in electrical communication with a power source and the relay for each battery of the battery group, the battery power control unit comprising a processor and a memory, the memory including an executable program whereby the processor executes the program to monitor the condition of each battery of the battery group, wherein responsive to a monitored condition of a battery of the battery group being less than a threshold value, the battery management control unit (i) transmitting a signal to cause the relay for the battery to switch to the open position, and (ii) transmitting a signal to cause the relay for another battery in the battery group to switch to the closed position; and e) a first spring-biased clamp defined on the second side of the substrate, the first spring-based clamp including a first electrically conductive portion, wherein the first spring-biased clamp is configured to engage a protruding positive terminal of each vehicle battery, whereby the first electrically conductive portion is placed in electrical communication with the protruding positive terminal of each vehicle battery, and a second spring-biased clamp including a second electrically conductive portion, wherein the second spring-biased clamp is configured to engage a protruding negative terminal of each vehicle battery, whereby the second electrically conductive portion is placed in electrical communication with the protruding negative terminal.

2. The device as recited in claim 1, wherein the first spring-biased clamp further comprises first clamp opposing portions, each first clamp opposing portion having an inner surface and an outer surface, the first clamp opposing portions being mounted adjacent to the first receiving port, the first clamp opposing portions being biased towards one another whereby the protruding positive terminal forces the first clamp opposing portions to move outwardly responsive to being received by the first receiving port.

3. The device as recited in claim 2, wherein the second spring-biased clamp further comprises second clamp opposing portions, each second clamp opposing portion having an inner surface and an outer surface, the second clamp opposing portions being mounted adjacent to the second receiving port, the second clamp opposing portions being biased towards one another whereby the protruding negative terminal forces the second clamp opposing portions to move outwardly responsive to being received by the second receiving port.

4. The device as recited in claim 3, wherein the set of electrical conductors comprises the inner surfaces of the first and second clamp opposing portions.

* * * * *